(12) United States Patent
Curtis

(10) Patent No.: US 6,260,855 B1
(45) Date of Patent: Jul. 17, 2001

(54) WORKHOLDING APPARATUS

(75) Inventor: William A. Curtis, Stanley, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/149,200

(22) Filed: Sep. 8, 1998

(51) Int. Cl.$^7$ ....................................................... B23B 5/22
(52) U.S. Cl. .............................. 279/51; 279/110; 409/233
(58) Field of Search ..................................... 279/106, 109, 279/110, 118, 119, 121, 143, 57, 51, 2, 45, 52, 65, 66; 409/233

(56) References Cited

U.S. PATENT DOCUMENTS

| | | | |
|---|---|---|---|
| 2,574,754 | * 11/1951 | Peters | 279/51 |
| 3,083,976 | 4/1963 | Stark . | |
| 3,244,427 | 4/1966 | Taschl . | |
| 3,517,939 | 6/1970 | Jaehn . | |
| 3,612,384 | * 10/1971 | Loyd | 228/2 |
| 3,735,994 | 5/1973 | Jaehn . | |
| 3,877,329 | 4/1975 | Noa . | |
| 4,031,810 | 6/1977 | Nattefort . | |
| 4,202,102 | * 5/1980 | Nakanishi | 433/127 |
| 5,354,076 | * 10/1994 | Yeo et al. | 279/110 |
| 5,806,859 | * 9/1998 | Saccomanno | 279/143 |

\* cited by examiner

*Primary Examiner*—Lee Young
*Assistant Examiner*—Sean Smith
(74) *Attorney, Agent, or Firm*—Robert L. McDowell

(57) ABSTRACT

An apparatus for holding a workpiece in a predetermined position in a machine tool. The apparatus has an axis of rotation and comprises an outer body having an outer surface, an inner bore, a first end and a second end with the second end being insertable into a tapered opening of a spindle of the machine tool. The outer body includes means projecting radially from the outer surface for abutment against a face of the spindle for stopping inward movement of the apparatus upon achieving a predetermined final position in the spindle. A portion of the outer surface adjacent the stop means and extending toward the second end is inwardly tapered by an amount whereby the taper of the outer surface is generally equal to the taper of the spindle opening. The workholding apparatus includes a connector attached to the second end of the outer body, the connector having a first end insertable into the second end of the outer body and a second end comprising a plurality of spaced-apart lugs extending radially outward. The inventive apparatus further comprises a collet located at the first end of the inner bore and a contractor located in the inner bore. The contractor is axially movable and comprises a first end having one or more angled surfaces in contact with respective angled surfaces on the collet whereby axial movement of the contractor expands or contracts the collet. The contractor has a second end comprising a plurality of spaced-apart lugs extending radially outward.

10 Claims, 4 Drawing Sheets

WORKHOLDING APPARATUS

FIELD OF THE INVENTION

The present invention is directed workholding equipment. Specifically, the present invention discloses a workholding apparatus for securing a toothed workpiece in a machine tool in which the workholding apparatus is quickly secured in, and released from, the spindle of the machine tool by the movement of components of the workholding apparatus.

BACKGROUND OF THE INVENTION

In metalworking operations where a workpiece is machined, equipment of some type is necessary to hold the workpiece in position in a machine tool so the machining process can be successfully carried out. This type of equipment is known as "workholding" equipment. In the production of toothed articles, such as gears, workholding equipment can be generally categorized as two types, chucks and arbors.

Chucks hold a workpiece by contracting a component called a "collet" around the workpiece or a component thereof. For example, when a bevel or hypoid pinion with integral shaft is placed in a chuck, it is usually the shaft that is gripped by the collet which has been reduced in diameter to grip the shaft to hold the pinion in position. Examples of chucks for gripping pinion shanks can be found in U.S. Pat. No. 3,083,976 to Stark and U.S. Pat. No. 3,244,427 to Taschl.

Arbors grip a workpiece by expanding a collet into contact with a surface of the workpiece. As an example, a bevel ring gear is placed on an arbor and the collet is expanded until contact of sufficient force is established with the surface of the bore of the ring gear to hold the ring gear in position during machining. An example of an arbor for a ring gear can be found in U.S. Pat. No. 3,735,994 to Jaehn. An arbor for expanding into contact with the bore of a pinion can be found in U.S. Pat. No. 3,517,939 to Jaehn.

In either chucks or arbors, the force necessary to contract or expand the collet mechanism is provided by a draw bar in the machine tool. The draw bar is advanced and/or retracted usually with a hydraulically operated piston. Movement of the draw bar in the axial direction of the chuck or arbor usually causes opposed angled surfaces of components within the workholding equipment to slide relative to one another resulting in inward (contracting) or outward (expanding) movement of the collet to grip a workpiece or component part thereof. Generally, one angled surface is found on the collet and the other angled surface is found on an actuator attached to the draw bar or on the draw bar itself.

Chucks and arbors are mounted for rotation in the bore of a machine tool spindle. The spindle bore is usually tapered and a similar taper is usually found on the outer surface of the chuck or arbor. Once placed in the spindle bore, a plurality of bolts are extended through holes in a mounting flange located about the spindle and into engagement with corresponding threaded holes on the face of the machine spindle.

Securing a chuck or arbor to a machine tool spindle, or ejecting it from the machine tool spindle, are manually performed operations that are very time consuming since the many bolts must be tightened to specifications. When removing the chuck or arbor, aside from the time necessary to loosen and remove all of the bolts, ejector screws usually must be utilized to "break" the contact between the chuck/arbor outer tapered surface and the tapered inner surface of the spindle bore.

It is an object of the present invention to provide a means to reduce the amount of time needed to install a chuck or arbor in a machine spindle and/or remove it from the spindle.

It is a further object of the present invention to provide a chuck or arbor in which action of a draw bar not only results in a workpiece being gripped but also results in the chuck or arbor being positioned in the machine tool spindle.

SUMMARY OF THE INVENTION

The present invention is directed to an apparatus for holding a workpiece in a predetermined position in a machine tool. The apparatus has an axis of rotation and comprises an outer body having an outer surface, an inner bore, a first end and a second end with the second end being insertable into a tapered opening of a spindle of the machine tool. The outer body includes means projecting radially from the outer surface for abutment against a face of the spindle for stopping inward movement of the apparatus upon achieving a predetermined final position in the spindle. A portion of the outer surface adjacent the stop means and extending toward the second end is inwardly tapered by an amount whereby the taper of the outer surface is generally equal to the taper of the spindle opening.

The workholding apparatus includes a connector attached to the second end of the outer body, the connector having a first end insertable into the second end of the outer body and a second end comprising a plurality of spaced-apart lugs extending radially outward.

The inventive apparatus further comprises a collet located at the first end of the inner bore and a contractor located in the inner bore. The contractor is axially movable and comprises a first end having one or more angled surfaces in contact with respective angled surfaces on the collet whereby axial movement of the contractor expands or contracts the collet. The contractor has a second end comprising a plurality of spaced-apart lugs extending radially outward.

The present invention also includes an inventive draw rod having a first end located within a sleeve with both the first end of the draw rod and the end of the sleeve having spaced-apart lugs extending radially inward whereby lugs from the connector and contractor can pass through slots between the lugs on the draw rod and sleeve such that subsequent rotation of either set of lugs will result in all lugs attaining a face-to-face contact thereby coupling the contractor and connector to the draw rod and sleeve respectively.

DETAILED DESCRIPTION OF THE PREFERRED EMBODIMENT

The details of the present invention will now be discussed with reference to preferred embodiments and the accompanying drawings. In all drawings, like components will be referred to by the same reference numbers.

Figure 1:
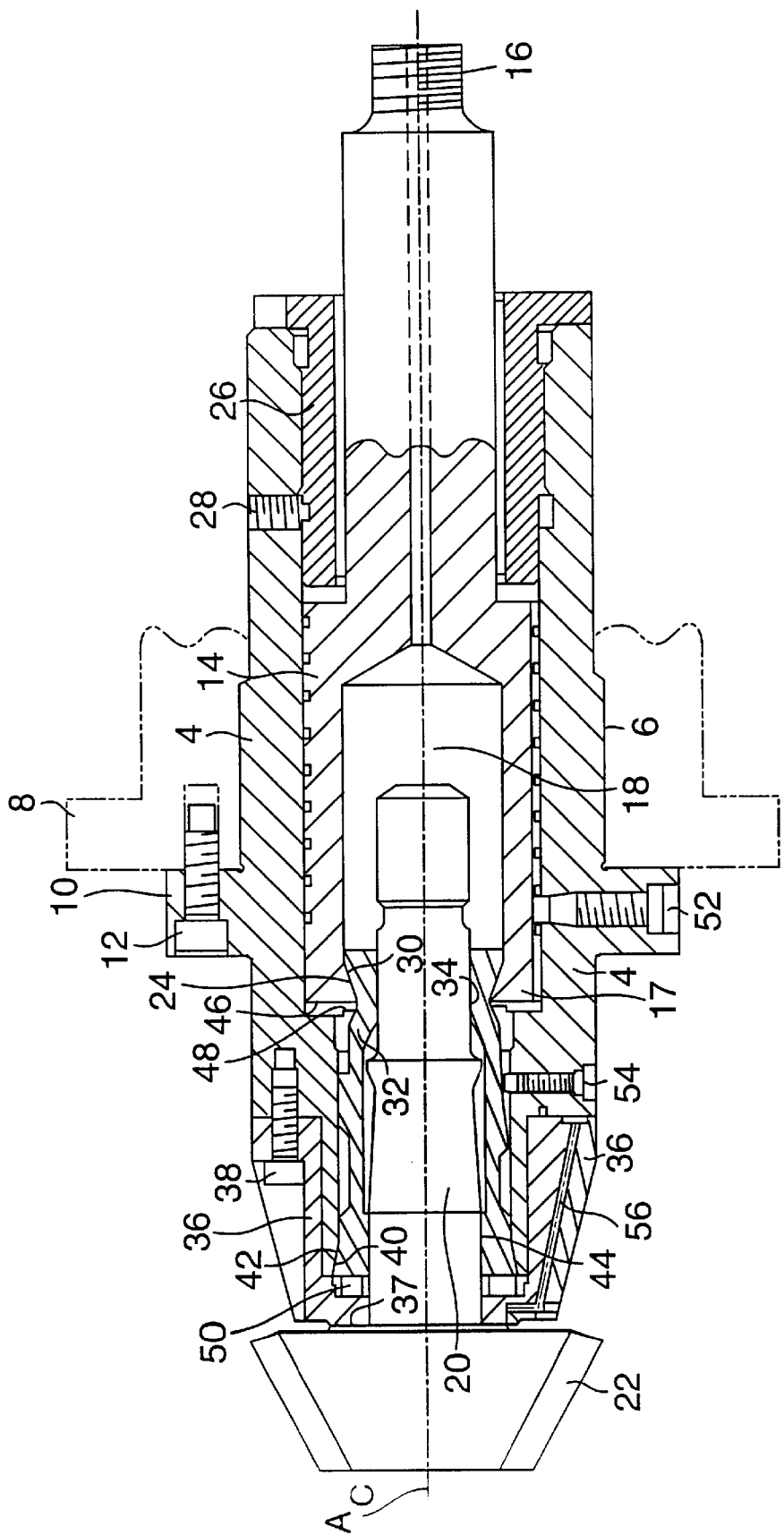
FIG. 1 is a cross-sectional view of a chuck belonging to the prior art.

FIG. 1 shows a chuck 2 of the prior art. The chuck 2 has an axis of rotation $A_C$ and comprises a chuck body 4 having a first end 5 and a second end 7 with a portion 6 of the outer surface of the body 4 being slightly tapered (about 1.5° for example) so that the chuck 2 will seat with a draw fit in the similarly tapered bore of a machine spindle 8. Chuck body 4 further includes a mounting flange 10 comprising holes spaced about the flange through which a plurality of screws 12 pass for securing the chuck 2 to the machine spindle 8. Only one of such screws 12 is shown in FIG. 1 although there are usually four or more spaced about the flange 10.

Arranged for sliding engagement within chuck body 4 is a contractor 14 having at one end thereof a threaded connection 16 to which a draw rod (not shown) is attached. The other end 17 of contractor 14 includes a hollowed-out portion 18 to allow room for the shank 20 of a pinion 22 to be inserted into the chuck 2. Contractor 14 is retained within chuck body 4 by a threaded sleeve 26 locked in position by set screw 28.

The end 17 of contractor 14 comprises angled surfaces 24 facing radially inward and oriented at an angle (such as about 15°). Specifically, end 17 comprises a plurality of lugs separated by slots and it is the face of the lugs that form the angled surfaces 24. Angled surfaces 24 of contractor 14 are in sliding contact with similarly oriented rear angled surfaces 30 of collet 32. The rear angled surfaces 30 of collet 32 are structured in a manner similar to the end 17 of contractor 14 in that a plurality of lugs with angled faces 30 are separated by slots. In bringing the angled surfaces 24, 30 together, the lugs of one of the collet 32 or the contractor 14 are inserted through the slots of the other and the collet and contractor are turned relative to one another to bring the angled surfaces 24, 30 into alignment.

Upon movement of the draw rod rearwardly (to the right in FIG. 1), angled surface 24 will slide on angled surface 30 causing the collet to contract and grip pinion shank 20 at location 34. Continued rearward movement of the draw rod causes rearward movement of the collet thus seating the pinion 22 against the front 37 of spindle nose 36 which is attached to chuck body 4 by a plurality of screws 38 (only one of which is shown). The continued rearward movement of contractor 14 and collet 32 also results in collet front angled surface 40 sliding against similarly angled surface 42 of chuck body 4 to grip pinion shank 20 at location 44. Front angled surface 40 is oriented at an angle smaller than rear angle 30, for example, about 7°.

To release a workpiece from chuck 2, the draw rod is moved forward (to the left in FIG. 1) to release the steeper angled surfaces 24, 30. However, the lesser angled surfaces 40, 42 are effectively locked due to their small angles. Thus, continued forward movement of the draw rod causes the front surface 46 of the contractor 14 to impact shoulder 48 on collet 32 to break the locked relationship between angled surfaces 40, 42. Forward movement of the collet is stopped by gasket 50.

Set screws 52 and 54 control alignment of the contractor 14 and collet 32, respectively. Air passage 56 is a known safety feature whereby air flow through the passage 56 prohibits machine operation but when a pinion 22 is loaded and air flow is impeded, machine operation may commence.

As stated above, positioning or removing the chuck 2 from a machine spindle 8 requires screws 12 to be inserted or removed which takes time. Applicant has discovered that the action of the draw rod may be utilized not only to grip a workpiece but also to secure a chuck in the machine spindle.

Figure 2:
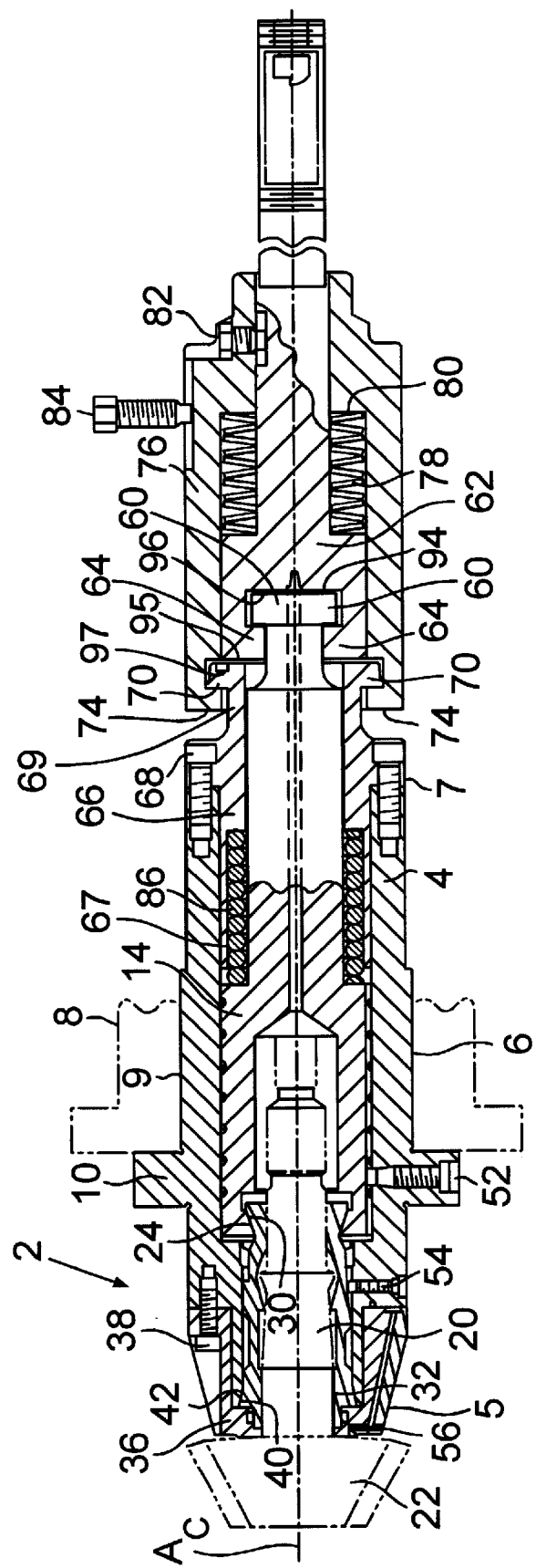
FIG. 2 is a cross-sectional view of a chuck according to the present invention.

FIG. 2 shows a chuck of the present invention in a position to load or eject a workpiece such as pinion 22. The manner in which the workpiece is gripped is not different from FIG. 1. However, the chuck shown in FIG. 2 may be positioned in the bore of a spindle of a machine tool without the need for screws to hold the chuck in position.

The rearward end of the contractor 14 has been modified to include a plurality of lugs 60 extending radially outward from axis $A_C$ at the rearward end of the contractor. The lugs 60 are separated by slots. The draw rod 62 has also been modified at its inner end to include alternating lugs 64 and slots, the lugs 64 extending radially inward with respect to axis $A_C$. The configuration of the lugs and slots of the contractor 14 and draw rod 62 being that the lugs pass through the slots at which time one of the contractor 14 or draw rod 62 is turned to align the lugs 60, 64 whereby the draw rod 62 may exert force on the contractor 14 to close collet 32.

The present invention also includes a connector 66 having a first end 67 and a second end 69 secured to the second or inner end 7 of chuck body 4 via screws 68. The second or inner end 69 of connector 66 comprises a plurality of alternating lugs 70 and spaces, with the lugs 70 extending radially outward with respect to axis $A_C$. The lugs 70 of connector 66 are aligned with lugs 74 of sleeve 76. As with the lugs 60 and 64, lugs 70 and 74 are separated by spaces which allow lugs of each member to pass through the slots of the other member and then be turned to align lugs 70, 74 in a face-to-face manner as is shown in FIG. 2. The lugs 60 and 70 of the contractor 14 and connector 66, respectively, are arranged such that they simultaneously fit through the respective slots at the end of draw bar 62 and the end of sleeve 76. Therefore, only one turning motion is necessary to engage lugs 60 with lugs 64, and lugs 70 with lugs 74. Set screws 82 and 84 are included to control alignment of the draw rod 62 and sleeve 76, respectively. Spring 86 keeps contractor 14 in an advanced position (to the left in FIG. 2) so that proper spacing exists between lugs 60 and 70 for their insertion through and engagement with lugs 64 and 74.

When contractor 14 is moved rearwardly (to the right in FIG. 2) to close collet 32, spring 78 is compressed which exerts a force on shoulder portion 80 of sleeve 76 thus causing rearward movement of sleeve 76 and hence, rearward movement of chuck body 4. It is this movement that pulls chuck body 4 into the spindle bore of a machine tool to seat the tapered outer surface 6 of the chuck in the tapered inner surface 9 of the spindle bore. Since there must be some compression of spring 78 to move sleeve 76, it can be seen that the workpiece 22 will be gripped slightly before the chuck is seated in the spindle bore. As an example, for a pinion having a shaft diameter of about 1.5 inches, spring 78 should have a compressed force of about 2100 lbs. while spring 86 should have a compressed force of about 120 lbs.

Figure 3:
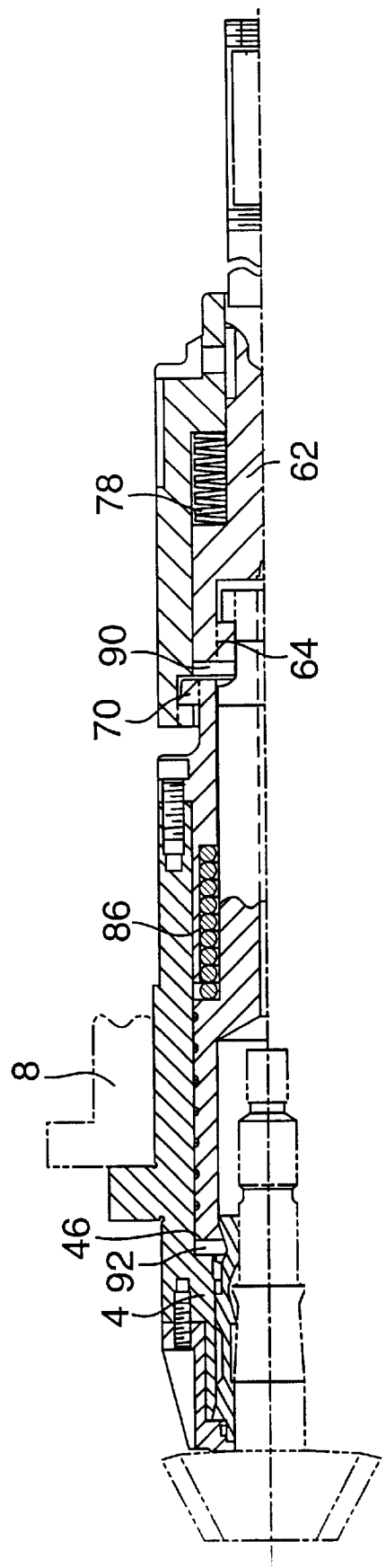
FIG. 3 is a partial cross-section of the chuck of FIG. 2 with the workpiece and chuck both in position for machining to commence.

With the workpiece 22 fully gripped and the chuck 2 seated in the spindle bore, the condition as shown in FIG. 3 exists. Namely, a gap 90 exists between lugs 64 and lugs 70 and another gap 92 exists between the front surface 46 of contractor 14 and the chuck body 4. These gaps are due to the draw rod 62 being at the extreme rearward position. Thus, springs 78 and 86 are at their maximum compression in the chuck.

To release a workpiece from the chuck, draw rod 62 is moved forward (to the left in FIG. 2) so that inner surface 94 engages the end surface 96 of contractor 14 to urge contractor 14 forward thus releasing the steeper angled surfaces 24, 30. As this occurs, spring 86 urges contractor 14 further forward releasing lesser angled surfaces 40 and 42 by movement of front surface 46 against shoulder 48 (best seen in FIG. 1). The conditions shown in FIG. 4 now exist. Namely, gap 90, although narrowed, still exists due to spring 86 pushing contractor 14 forward, and gap 92 is gone.

Further forward movement of the draw rod 62 is necessary to eject the chuck 2 from its seated position in the machine spindle 8. This can be accomplished by inner end surface 94 of draw rod 62 closing the gap 90 (FIG. 4) and again contacting the end surface 96 of contractor 14, or, outer end surface 95 of draw rod 62 may contact the end surface 97 of connector 66 (FIG. 2). Alternatively, contact between surfaces 94, 96 and 95, 97 may occur simultaneously.

Figure 4:
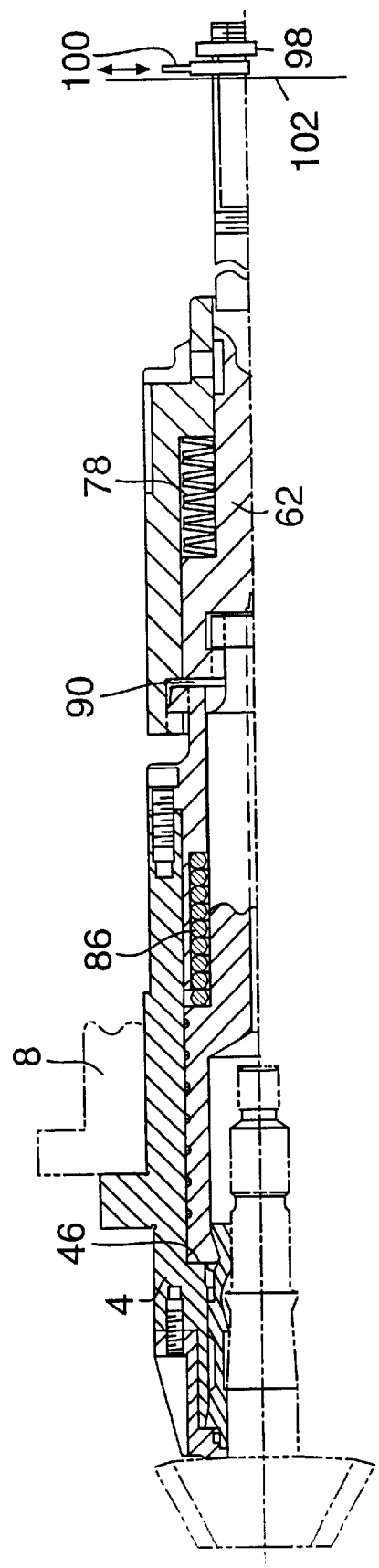
FIG. 4 is a partial cross-section of the chuck of FIG. 2 with the chuck in position for the workpiece to be removed.

It may be desired to include a stop mechanism at the inner end of the draw rod 62 to prevent inadvertent forward movement of the draw rod 62 beyond that distance necessary to remove a workpiece from the chuck 2. Such a mechanism may include a nut 98 affixed at the end of the draw rod 62 and a yolk 100 which can be placed between the nut 98 and a surface 102 of the machine tool to restrict forward movement of the draw rod 62. The yolk 100 may be movable either manually or by an automatic means, such as an electric motor, between an engaged position as shown in FIG. 4 and a remote position as illustrated by the double arrow.

Although the present invention has been discussed with reference to a chuck, the inventive concept is equally applicable to an arbor. The action of the draw bar to engage a collet with the inner bore of a workpiece also can effect seating of the arbor in the spindle of a machine tool.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for holding a workpiece in a predetermined position in a machine tool, said apparatus having an axis of rotation and comprising:

a chuck body having an outer surface, an inner bore, a first end and a second end with said second end being insertable into a tapered opening of a spindle of said machine tool, said chuck body including stop means projecting radially from said outer surface for abutment against a face of said spindle for stopping inward movement of said apparatus upon achieving a predetermined final position in said spindle, a portion of said outer surface adjacent said stop means and extending toward said second end being inwardly tapered by an amount whereby the taper of said outer surface is generally equal to the taper of said spindle opening;

a connector attached to said second end of said chuck body, said connector having a first end insertable into the second end of said chuck body and said connector having a second end comprising a plurality of spaced-apart lugs extending radially outward;

a collet located in said inner bore at said first end, a contractor located in said inner bore, said contractor being axially movable and comprising a first end having one or more angled surfaces in contact with respective angled surfaces on said collet whereby axial movement of said contractor expands or contracts said collet, said contractor having a second end comprising a plurality of spaced-apart lugs extending radially outward.

2. The apparatus of claim 1 being a chuck.

3. The apparatus of claim 1 being an spindle.

4. The apparatus of claim 1 further comprising a spring located within said inner bore and between shoulder portions on said connector and said contractor.

5. The apparatus of claim 1 being operable at a position wherein said workpiece is insertable and/or removable from said apparatus while said workholding apparatus remains seated in said spindle.

6. A draw rod for a machine tool, said draw rod comprising: a first end and a second end with said first end positionable within a spindle of said machine tool, said first end being located within a sleeve with said first end and an adjacent end of said sleeve each comprising a plurality of spaced-apart lugs extending radially inward, whereby said spaced apart lugs of said first end and said sleeve are positioned such that corresponding spaced-apart lugs extending radially outward on a workholding device may pass through the spaces, either said lugs of said draw rod or said workholding device then being rotatably movable to bring all lugs into a face-to face position.

7. The draw rod of claim 6 further comprising stop means at said second end for limiting advancement of said draw rod to a predetermined amount.

8. The combination of a workholding apparatus and a draw rod for a machine tool, said combination comprising:

said workholding apparatus having an axis of rotation and comprising:

a chuck body having an outer surface, an inner bore, a first end and a second end with said second end being insertable into a tapered opening of a spindle of said machine tool, said chuck body including stop means projecting radially from said outer surface for abutment against a face of said spindle for stopping inward movement of said apparatus upon achieving a predetermined final position in said spindle, a portion of said outer surface adjacent said stop means and extending toward said second end being inwardly tapered by an amount whereby the taper of said outer surface is generally equal to the taper of said spindle opening;

a connector attached to said second end of said chuck body, said connector having a first end insertable into the second end of said chuck body and said connector having a second end comprising a plurality of spaced-apart lugs extending radially outward;

a collet located in said inner bore at said first end, a contractor located in said inner bore, said contractor being axially movable and comprising a first end having one or more angled surfaces in contact with respective angled surfaces on said collet whereby axial movement of said contractor expands or contracts said collet, said contractor having a second end comprising a plurality of spaced-apart lugs extending radially outward; and, said draw rod comprising:

a first end and a second end with said first end positionable within a spindle of said machine tool, said first end being located within a sleeve with said first end and an adjacent end of said sleeve each comprising a plurality of spaced-apart lugs extending radially inward, whereby said spaced apart lugs of said first end and said sleeve are positioned such that corresponding spaced-apart lugs extending radially outward on said workholding device may pass through the spaces, either said lugs of said draw rod or said workholding device then being rotatably movable to bring all lugs into a face-to face position.

9. The combination of claim 8 wherein said workpiece and said workholding apparatus are seated with said draw rod in a rearward position, said workpiece and said workholding apparatus being in a released condition with said draw rod being in a forward position, and, said workpiece being released and said workholding apparatus being seated with said draw rod being in an intermediate position.

10. The combination of claim 9 further comprising stop means at said second end of said draw rod for limiting forward movement of said draw rod to said intermediate position.

* * * * *